Patented Apr. 6, 1926.

1,579,413

UNITED STATES PATENT OFFICE.

VICTOR JULIEN MARIE THÉSÉE, OF BREST, FRANCE.

STERILIZING SUBSTANCE FOR TOOTHBRUSHES AND SIMILAR ARTICLES.

No Drawing. Original application filed May 21, 1923, Serial No. 640,469. Divided and this application filed June 4, 1925. Serial No. 35,004.

*To all whom it may concern:*

Be it known that I, VICTOR JULIEN MARIE THÉSÉE, a citizen of the French Republic, residing at Brest, Department of the Finistere, in France, have invented certain new and useful Improvements in Sterilizing Substances for Toothbrushes and Similar Articles, of which the following is a specification.

The invention relates to a sterilizing substance which is adapted to be placed in a small box provided in a container of tubular shape and generally made of glass or crystal. This application is a division of my copending application 640,469 filed May 21, 1923.

For sterilizing tooth brushes practice has proved that it is very advantageous to shorten as much as possible the time limit necessary for a complete sterilization, in order to allow the use of the brush several times in a day in an effective sterilized state. With this object in view, according to the invention, trioxymethylene is generally used, with an addition of an equal quantity of soda-tungstate, for it has been found that the latter activates the known properties of the former. It acts at the same time as an exciter and regulator, practice having demonstrated that the length of the operation is reduced with said mixture in the ratio of 5 to 1 compared with the use of the trioxymethylene alone.

Besides it has been proved that it is advantageous to add a certain quantity of vegetable essence, such as orange essence or thyme essence, which, on account of the fact that essences possess sterilizing qualities, add their action to that of the trioxymethylene exhalations. Furthermore, these essences offer the advantage of diminishing the disagreeable smell of the formic aldehyde.

The proportions are subject to very large variations of trioxymethylene, soda-tungstate and vegetable essence (orange essence, thyme essence, etc.), the latter inherently possessing distinct sterilizing qualities. This mixture causes exhalations which penetrate through holes in the box and spread in the container. The surplus, as well as the exhalations caused by the moisture of the brush, penetrates through holes of the lid of the container.

It may be added that it is only necessary to change the mixture every three months, and during said time the sterilization is easily effected; besides it has been proved by experiments carried out by qualified bacteriologists that the time required for effective sterilization is very short, at most four hours, while with formol, for example, 24 hours are necessary and it has to be renewed every three or four days.

Having thus fully described the invention what is claimed as new and desired to be secured by Letters Patent is:—

1. A substance for sterilizing tooth brushes and like articles comprising a mixture of substantially equal parts of trioxymethylene and soda tungstate and a vegetable essence having sterilizing properties and of a quality sufficient to effect deodorization.

2. A substance as claimed in claim 1, in which orange essence is employed.

In testimony whereof I hereunto affix my signature.

VICTOR JULIEN MARIE THÉSÉE.